(12) United States Patent
Whalley

(10) Patent No.: US 10,299,445 B2
(45) Date of Patent: May 28, 2019

(54) CENTER PIVOT IRRIGATION SYSTEM WITH UNIFORMITY OF APPLICATION OF WATER UNDER THE CORNER ARM

(71) Applicant: TRIMBLE NAVIGATION LIMITED, Sunnyvale, CA (US)

(72) Inventor: Mark Jonathan Whalley, Christchurch (NZ)

(73) Assignee: TRIMBLE INC., Sunnyvale, CA (US)

(*) Notice: Subject to any disclaimer, the term of this patent is extended or adjusted under 35 U.S.C. 154(b) by 228 days.

(21) Appl. No.: 14/961,329

(22) Filed: Dec. 7, 2015

(65) Prior Publication Data
US 2017/0156273 A1    Jun. 8, 2017

(51) Int. Cl.
| B05B 1/20 | (2006.01) |
| B05B 1/30 | (2006.01) |
| A01G 25/09 | (2006.01) |
| A01G 25/16 | (2006.01) |

(52) U.S. Cl.
CPC .......... *A01G 25/092* (2013.01); *A01G 25/16* (2013.01); *A01G 25/165* (2013.01); *B05B 1/20* (2013.01); *B05B 1/30* (2013.01)

(58) Field of Classification Search
CPC .... A01G 25/092; A01G 25/165; A01G 25/16; B05B 1/30; B05B 1/20
See application file for complete search history.

(56) References Cited

U.S. PATENT DOCUMENTS

| 4,142,684 A * | 3/1979 | Schweitzer | B05B 1/3053 |
| | | | 118/302 |
| 4,186,880 A * | 2/1980 | Jacobi | A01G 25/092 |
| | | | 239/729 |
| 5,048,755 A * | 9/1991 | Dodds | A01G 25/16 |
| | | | 137/78.2 |
| 5,134,961 A * | 8/1992 | Giles | A01M 7/0089 |
| | | | 118/300 |
| 5,246,164 A * | 9/1993 | McCann | A01B 79/005 |
| | | | 239/11 |
| 5,255,857 A * | 10/1993 | Hunt | A01G 25/092 |
| | | | 239/731 |
| 5,279,068 A * | 1/1994 | Rees | A01B 69/001 |
| | | | 180/169 |
| 5,678,771 A * | 10/1997 | Chapman | A01G 25/092 |
| | | | 239/727 |

(Continued)

Primary Examiner — Arthur O. Hall
Assistant Examiner — Steven M Cernoch
(74) Attorney, Agent, or Firm — Marsh Fischmann & Breyfogle LLP; Kent A. Lembke

(57) ABSTRACT

A center pivot irrigation system adapted for more uniform application of water. The system includes a pivot sprinkler arm with a first set of spaced apart nozzles. The system includes a first set of control valves each provided on the pivot sprinkler arm upstream of a nozzle. The irrigation system includes a corner sprinkler arm pivotally coupled to an end of the pivot sprinkler arm. The corner sprinkler arm includes a second set of spaced apart nozzles and a second set of control valves each provided upstream of a nozzle. The irrigation system includes a controller transmitting control signals to the first and second sets of control valves to open and close in a pattern defined by a valve pulsing pattern for the pivot sprinkler arm and a valve pulsing pattern for the corner sprinkler arm, whereby input water is applied in a uniform manner under the corner sprinkler arm.

10 Claims, 7 Drawing Sheets

(56) References Cited

U.S. PATENT DOCUMENTS

| | | | |
|---|---|---|---|
| 6,085,999 A * | 7/2000 | Gerdes | A01G 25/092 239/66 |
| 6,666,384 B2 | 12/2003 | Prandi | |
| 6,928,339 B2 | 8/2005 | Barker | |
| 6,938,842 B2 | 9/2005 | Choat et al. | |
| 7,953,550 B1 | 5/2011 | Wieting | |
| 8,185,303 B1 | 5/2012 | Wieting | |
| 8,494,682 B2 | 7/2013 | Elmer et al. | |
| 8,494,763 B1 | 7/2013 | Wieting | |
| 8,739,830 B2 | 6/2014 | Bradbury et al. | |
| 8,849,467 B2 * | 9/2014 | Korus | A01G 25/092 239/722 |
| 8,849,468 B2 | 9/2014 | Abts et al. | |
| 2002/0066810 A1 * | 6/2002 | Prandi | A01G 25/092 239/728 |
| 2012/0228395 A1 * | 9/2012 | Needham | F16K 31/0606 239/11 |

\* cited by examiner

CENTER PIVOT IRRIGATION SYSTEM WITH UNIFORMITY OF APPLICATION OF WATER UNDER THE CORNER ARM

BACKGROUND

1. Field of the Invention

The present invention generally relates to systems and methods for controlling operation of a center pivot irrigation system and, more particularly, to a center pivot irrigation system with a corner arm that is configured to provide, with the irrigator's corner arm nozzles (e.g., drop nozzles), constant depth of water application on land irrigated by the corner arm.

2. Relevant Background

In many areas of the world, the agricultural industry relies upon effective irrigation to raise crops. Irrigation may be used due to limited rainfall or rainfall that is not adequate for a particular crop. Further, irrigation may be utilized due to the variability in the timing of rainfall as many crops require a relatively consistent amount of water over their growing period.

Center pivot irrigation is one of the most water-efficient irrigation techniques. Center pivot irrigation is a form of overhead sprinkler irrigation that makes use of a long sprinkler arm formed of several segments of pipe joined together and supported by trusses. The pipe segments are mounted on wheeled towers each typically driven by an electric motor. Sprinklers or sprinkler heads are spaced apart along the length or span of the sprinkler arm. The sprinkler arm is centrally anchored such that the sprinkler arm moves in a circular pattern, and water is fed into the sprinkler arm at the center of the circle via one, two, or more pumps that may be positioned anywhere between the sprinkler arm and a water source such as an aquifer.

The outside set of wheels on the arm may set the master pace for the rotation such as once every three days. The inner sets of wheels can be mounted at hubs or towers between two pipe segments, and angle sensors can be used to detect when the bend at the joint between the two segments exceeds a certain maximum threshold as an indication of when the electric motor driving the inner wheel sets should be rotated to keep the pipe segments generally aligned along the arm span. Center pivot sprinkler arms are typically less than about 1600 feet (or 500 meters) in length (i.e., irrigated circle radius) with a common size being 1320 feet (or a quarter mile or 400 meters) length or circle radius, but many pivot sprinkler arms may be much longer than 500 meters in length.

Most center pivot irrigation systems use sprinklers that hang down from the sprinkler arm pipe segments so that the sprinkler heads are positioned a few feet above the ground or crop so as to limit evaporative losses and wind drift. There are many different sprinkler head or nozzle configurations that may be used including a static plate, a moving plate, and so on with a rotator-style pivot applicator sprinkler head or nozzle being one of the more popular in present irrigation systems. The rotator-style sprinkler head or nozzle is adapted to work properly with input water at a particular pressure (or within a desired range and not very well or at all if too far below this pressure), and a pressure regulator may be provided upstream of each nozzle or sprinkler head to ensure that each is operating at the correct design pressure (not over pressurized).

It is typically an operational goal of a center pivot irrigation system to provide uniform application of water, which may include effluent, chemicals, and fertilizers, and to avoid applying too much water in one application (e.g., by running too slowly) so as to reduce run-off and leaching. To achieve such uniform application, the center pivot irrigation system generally requires an even emitter flow rate across the length or span of the sprinkler arm. Since the outer-most pipe segments and wheeled towers travel farther in a given time period (e.g., at a higher speed) than the inner-most pipe segments and wheeled towers, nozzle sizes may be smallest at the inner spans and increase in size with distance from the pivot point such that a greater flow of water is output at positions on the sprinkler arm that is moving the fastest (and a lower flow of water is output at positions on the sprinkler arm that is moving the slowest).

While center pivot irrigation systems are considered to be highly efficient systems that are useful in conserving water, there remains a number of challenges associated with their use to irrigate crops. One challenge is that center pivot irrigation systems may also include a corner sprinkler arm (or corner arm extension system) extending outward from the last regular drive of the pivot sprinkler arm, and it can be difficult to provide uniform application of water from the corner sprinkler arm. The last regular drive and/or tower provides the final set of drive wheels at the outer most point of the pivot sprinkler arm (e.g., a point in the pipe section or span that is most distal to the center point or rotation axis), and the corner sprinkler arm (or corner arm section) is a section of pipe that has a steerable set of wheels enabling it to trail behind the main pivot pipe or pivot sprinkler arm or to swing out so as to extend the effective length (or radius) of the center pivot irrigation system. The use of corner sprinkler arms is desirable as it enables the irrigation system to irrigate into the corners of a field (e.g., irrigate a more square geographic area) rather than just irrigating a circular portion of the field.

The use of a corner sprinkler arm in a center pivot irrigation system can be problematic because the corner sprinkler arm typically has not provided very good uniformity of depth of application during irrigation operations. As discussed above, uniform depth is important to farmers to achieve consistency of crop growth across their irrigated fields. Non-uniformity results because as the corner sprinkler arm is opening up (its outer end is swung out relative to the last regular drive), the end of the corner sprinkler arm at the outermost extent of irrigation must travel at a speed that is much faster than the last regular drive. Also, as the corner sprinkler arm is falling back behind the main part of the pivot sprinkler arm, the outer end of the corner sprinkler arm must travel at a speed that is much slower than the last regular drive of the pivot sprinkler arm. Conversely, the opposite is true when the irrigation system is running in a reverse direction.

The speed that nozzles on the corner sprinkler arm travel over the ground is directly correlated with the depth of the application of water. For example, a nozzle will apply less water to the ground when the corner sprinkler arm is opening up and traveling faster when compared with the same nozzle traveling more slowly as it is falling back or is trailing behind the last regular drive of the pivot sprinkler arm. To further complicate the problem of non-uniformity of application, the position of nozzles differs between irrigation systems designed and/or manufactured by different companies as does the actual path the corner arm follows during irrigation processes. As a result, each nozzle of a corner sprinkler arm of each irrigator system can have its own unique acceleration and deceleration profile. Another problem with providing uniform application with a corner sprinkler arm is that the same piece of land (or portion of an irrigated field) may be affected by two or more nozzles passing over it, with each at the same or different flow rates and/or speeds.

Center pivot irrigation system manufacturers have attempted to address the non-uniformity problem associated with corner sprinkler arms by turning off banks of nozzles depending on the bearing or present location of the pivot sprinkler arm in a field. For example, banks of four nozzles each may be turned off in the corner sprinkler arm. However, this and other approaches to improved control of the irrigation system have not proven effective and do not tend to provide good uniformity (or acceptable uniformity) in water application by center pivot irrigation systems with corner sprinkler arms. Hence, there remains a need for an improved control method for operating such center pivot irrigation systems (and irrigation systems incorporating such a control method) to provide more uniform application of water (and other liquids/materials such as fertilizer) on portions of fields waters or affected by the corner sprinkler arm.

SUMMARY

Briefly, a center pivot irrigation system is described that includes a controller (e.g., hardware and software for controlling operations of the system) that operates to pulse control valves for the nozzles/sprinkler heads on and off as the main pivot sprinkler arm rotates in the field. Additionally, the controller pulses control valves for the nozzles/sprinkler heads on and off in a corner sprinkler arm extending out from an outer end of the main pivot sprinkler arm in a trailing state when at edges of the field and in an extended state when at corners of the field. The valve open/close pattern along the span or length of the corner sprinkler arm is chosen during each operating cycle (e.g., each valve duty cycle such as a time period in the range of 20 to 90 seconds or the like) such that the nozzles/sprinkler heads of the corner sprinkler arm provide a uniform depth of water application in the portions of the field affected by the corner sprinkler arm.

To this end, a plurality of valve open/close patterns are defined for the corner sprinkler arm for each of its locations and orientations during irrigation operations as it travels about the field with the pivot sprinkler arm, and each of these patterns is associated with a bearing of the pivot sprinkler arm. A controller is used to process data from a location monitor on the pivot sprinkler arm to determine its present bearing and, in response, to select a proper open/close pattern for the corner sprinkler arm and generate control signals to the control valves of the corner sprinkler arm to open/use the appropriate set of nozzles/sprinkler heads during the next valve duty cycle to provide uniform application of the input water.

More particularly, a center pivot irrigation system is provided that is specially adapted for more uniform application of input water on a field and, particularly, with an included corner arm pivotally coupled to an end of the main pivot arm. The system includes a pivot sprinkler arm including a first set of spaced apart nozzles. The irrigation system also includes a plurality of towers supporting the pivot sprinkler arm, and drives are provided on the wheeled towers to drive wheels on the towers to rotate the pivot sprinkler arm about a center pivot axis. In the irrigation system, a water supply is used to provide input water to the pivot sprinkler arm. Further, the system includes a first set of control valves each provided on the pivot sprinkler arm upstream of a nozzle in the first set of spaced apart nozzles.

Additionally, the irrigation system includes a corner sprinkler arm pivotally coupled to an end of the pivot sprinkler arm distal to the center pivot axis. The corner sprinkler arm includes a second set of spaced apart nozzles, a corner arm tower supporting the corner sprinkler arm with a drive on the corner arm tower to drive wheels on the corner arm tower to selectively place the corner sprinkler arm in a trailing position, in an extended position, and positions between the trailing position and the extended position, and a second set of control valves each provided on the corner sprinkler arm upstream of a nozzle in the second set of spaced apart nozzles. The irrigation system includes a controller running a valve operation module that transmits control signals to the first and second sets of control valves to open and close in a pattern defined by a valve pulsing pattern for the pivot sprinkler arm and a valve pulsing pattern for the corner sprinkler arm. In some situations, it may be desirable and/or useful to utilize multiple controllers. For example, two controllers may be provided in the system when there are more than 250 (or some other maximum number) or more valves. As discussed below, the corner system may be used in exclusion of valves on the first set of nozzles, e.g., a farmer may want uniformity on the corner but may not need valves on the main pivot sections to achieve this water application goal.

In some implementations of the irrigation system, the control signals are transmitted at the beginning of each valve duty cycle, and the valve duty cycles are equal time periods in the range of 20 to 90 seconds. In such implementations, the valve pulsing pattern for the corner sprinkler arm typically differs for at least a subset of the valve duty cycles (e.g., may be repeated for two or more cycles but then will change over to a new and different pattern of open/closed valves to use differing nozzles to apply water with the corner sprinkler arm).

In the same or other implementations of the irrigation system, a location monitor is provided that periodically determines a bearing of the pivot sprinkler arm (e.g., relative to the center pivot axis). In such cases, the valve pulsing pattern for the corner sprinkler arm is selected by the valve operation module based on the bearing of the pivot sprinkler arm. Further, the valve pulsing pattern for the corner sprinkler arm can be selected based on the bearing from a plurality of differing predefined open and closed patterns for valves on the corner sprinkler arm each associated with a different bearing of the pivot sprinkler arm. Additionally, the plurality of differing predefined open and closed patterns for the valves on the corner sprinkler arm can be adapted or designed to provide a uniform application of the input water from the second set of spaced apart nozzles of the corner sprinkler arm as the pivot sprinkler arm rotates about the center pivot axis with the water supply providing the input water.

Still further, the plurality of differing predefined open and closed patterns for the valves on the corner sprinkler arm can be generated from a simulation of travel of the pivot sprinkler arm and the corner sprinkler arm along a travel path in a field during irrigation operations of the field. In such cases, the simulation may include measuring application of water from both the pivot sprinkler arm and the corner pivot arm into a plurality of grid areas and comparing the measured application of water in the grid areas with a goal depth of irrigation for the field.

DETAILED DESCRIPTION

The following describes a center pivot irrigation system with a corner sprinkler arm, and the irrigation system includes a flow controller (or water flow controller) that is specially adapted to effectively control operations of the corner sprinkler arm to more uniformly apply water to an irrigated field (e.g., to the corners of the field watered by the corner arm and nearby affected areas). The control method provides control over uniformity by measuring and using position information for the corner sprinkler arm and individual nozzles (or sprinkler heads) such as by using position sensors on the pivot sprinkler arm and/or corner sprinkler arm (e.g., global position satellite (GPS) sensors or the like). The control method involves individual control over each nozzle based on a nozzle open/close pattern (or customized valve pulsing profile) that is used to generate control signals for control valves (e.g., solenoid valves) provided upstream of each of the nozzles/sprinkler heads.

The nozzles are pulsed open and closed for each duty or service cycle of the irrigation system (e.g., a cycle of once every 20 to 90 seconds or the like with 30 second cycles used in some embodiments) based on the valve pulsing profile to create multiple effective flow rates for each nozzle, and these flow rates may differ for each nozzle along the corner sprinkler arm. The inventor recognized that it may be useful to provide improved application control by simulating the center pivot irrigation system's characteristics in software including the speed of the corner sprinkler arm, the movement of the corner arm, the position, flow rate, and throw radius of each nozzle/sprinkler head in the corner arm. This simulation can then be used to calculate a valve pulsing profile (or nozzle open/closed pattern) that is optimized for uniformity of application depth.

Figure 1:
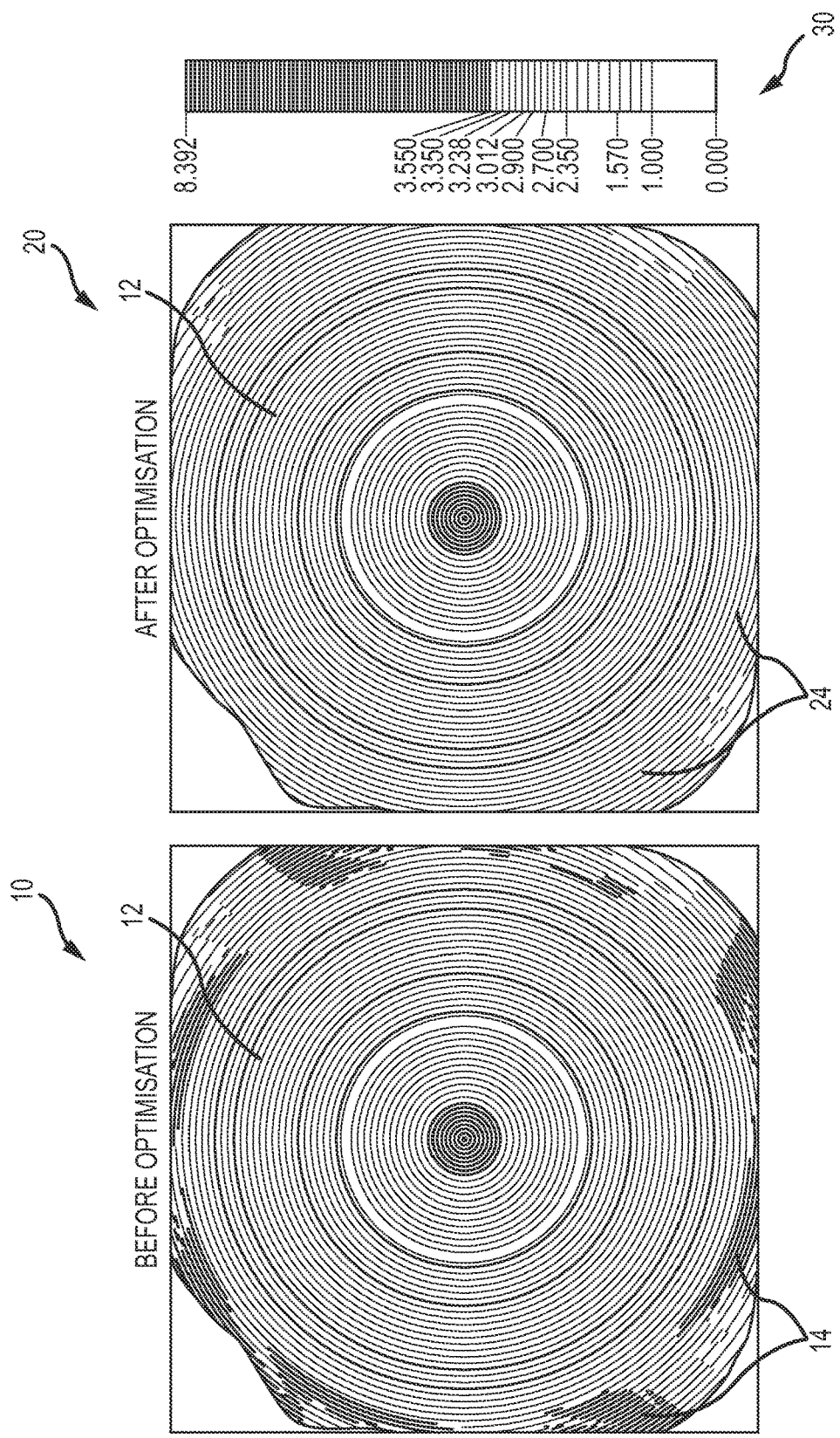
FIG. 1 illustrates a pair of graphs illustrating depth of application provided for a field irrigated without and with the control methods described herein using a center pivot irrigation system with a corner sprinkler arm.

For example, FIG. 1 illustrates a first graph 10 showing (based on legend 30) water application before the present control method (or optimization for uniformity) is applied. As shown, application is relatively uniform in the inner circular area 12 of the field that is under the nozzles/sprinkler heads of the main pivot sprinkler arm but is non-uniform outside this area 12 with areas 14 showing areas where over irrigation is a problem. The graph 10 may correspond with a simplistic control technique where valves associated with nozzles in the corner arm are all turned off or closed when the corner arm is tucked in or trailing the last regular drive (or outermost end) of the pivot sprinkler arm such as near the edges of the field rather than in the corners.

In contrast, the control method of the present description (or optimization for uniformity of application in the corner arm) is applied for the application graph 20. As shown, uniformity is retained in the center area 12. Further, though, uniformity is achieved in some of areas 24 that has proven problematic with prior control as shown at 14 in graph 10. As these diagrams/graphs 10, 20 show, over irrigation can be solved using the present control method for a center pivot irrigation system with a corner sprinkler arm. Note, though, under irrigation may be unaffected or less improved because the control method restricts the flow rate through valves in the corner sprinkler arm but cannot make more water flow through the pivot irrigation system.

Figure 2A:
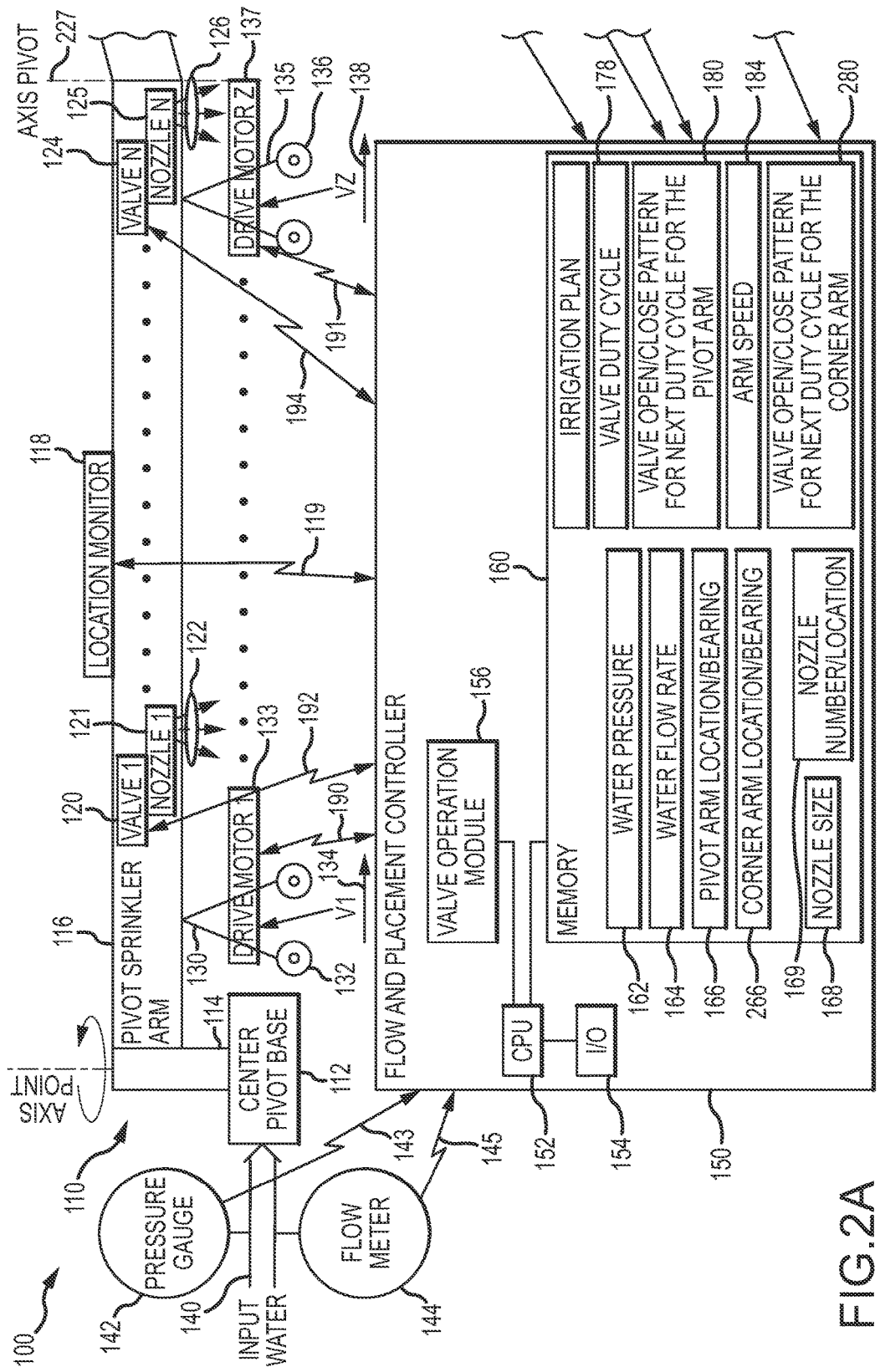
FIGS. 2A and 2B in combination provide a functional block diagram or schematic of a center pivot irrigation system of the present description with a corner sprinkler arm along with the conventional pivot sprinkler arm, with the system memory storing (e.g., with elements 168 and 169) data on a collection of valves/nozzles each with a design flow rate, ordinal location, and distance from center and last regular drive or end of the pivot sprinkler arm (to triangulate actual position)
Figure 2B:
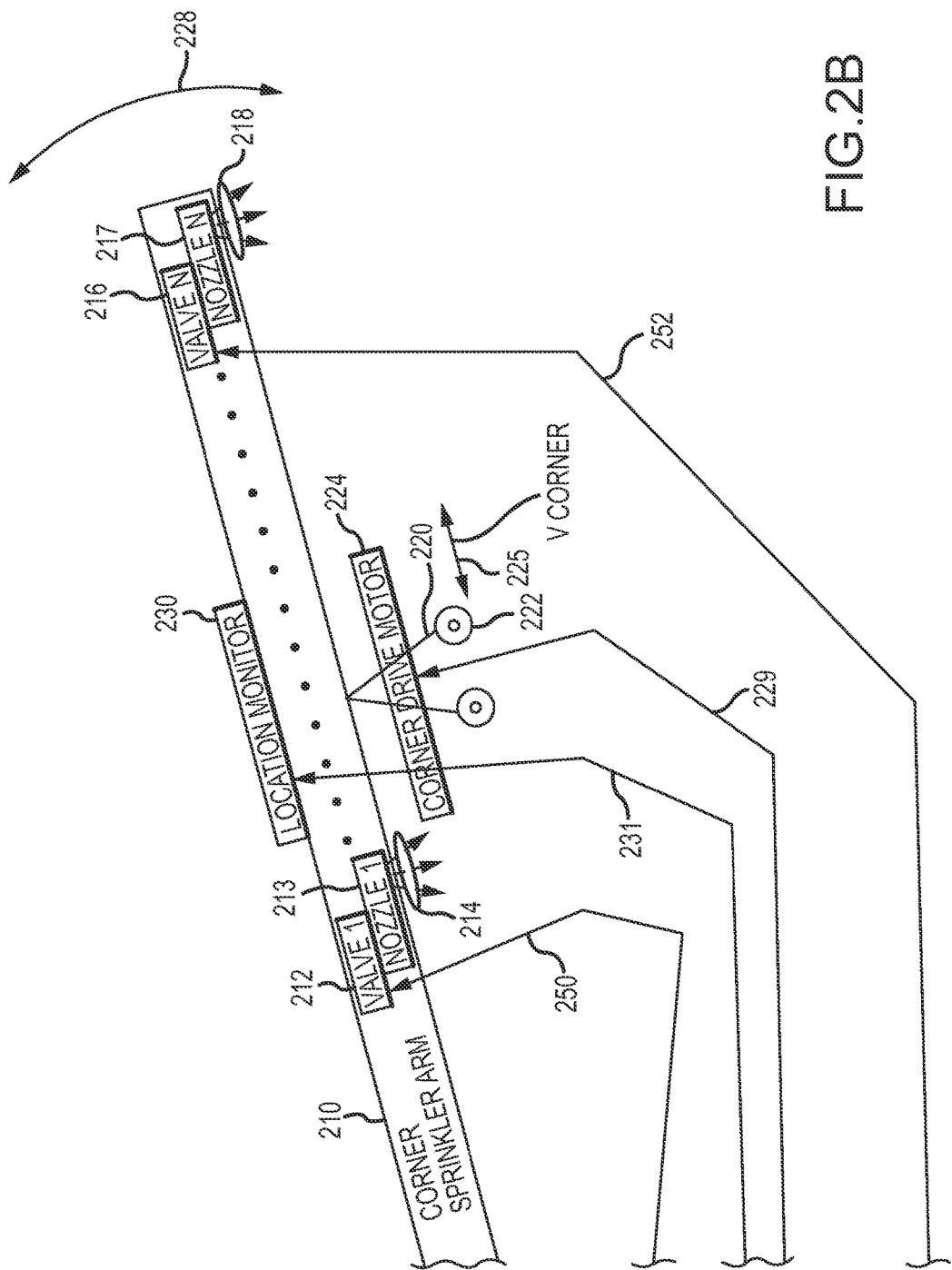

FIGS. 2A and 2B illustrate a center pivot irrigation system 100 that is configured to implement the control method or techniques described herein to provide uniform placement with combined use of a pivot arm and a corner arm. As shown, the irrigation system 100 includes a pivot irrigator (or sprinkler arm assembly) 110 that includes a center pivot base 112 upon which a pivot hub 114 is pivotally mounted. A pivot sprinkler arm 116, which typically would include a number of interconnected pipe segments, extends outward a distance such as 300 to 500 meters or the like. The pivot sprinkler arm 116 is supported by a number of towers 130, 135 that include a set of wheels 132, 136 and are driven at a rotation or arm speed as shown with arrows 134, 138 (and as $V_1$ and $V_Z$) by separately operable electric drive motors 133, 137. Typically, the outer most drive motor 137 (or "last regular drive" or last tower 135 with last set of wheels 136) is used to pace rotation of the arm 116 about the pivot axis, $Axis_{Point}$, with the inner drive motors 133 operating to maintain alignment of the various pipe segments of the arm 116. During irrigation operations, input water 140 is pumped or otherwise provided to the sprinkler arm 116 via the base 112 and hub 114 such as at a flow rate ranging from 400 gallons per minute (GPM) or less up to 2000 GPM or more. The input water flow rate typically is relatively constant for periods of time during a growing season but will typically vary at least periodically, e.g., vary from about 600 GPM at the beginning of a growing/irrigation season and then drop to 400 GPM toward the end of the growing season as the amount of water available for irrigation decreases.

The pivot irrigator 110 includes a plurality of nozzles 121, 125 spaced apart along the length or span of the pivot sprinkler arm 116 for use in selectively discharging the input water 140 from the arm 116 to irrigate a field/crop as shown with arrows 122, 126 (each with a particular "radius of application" or coverage radius). The irrigator 110 also includes a control valve 120, 124 upstream of each nozzle 121, 125 to allow individual control/operation of each nozzle 121, 125, which allows selective application of the input water 140 to irrigation zones/areas of a field. In some operations of the system 100, it may be desirable to provide uniform application of the input water in the irrigation zone/area while still utilizing a "constant" flow rate of the input water (i.e., without having to use a variable speed input pump). This can be achieved in part by selecting nozzles 121, 125 that have relatively large capacities or flow ratings for their design pressure (which is typically controlled by a pressure regulator (not shown) at each nozzle 121, 125). The amount of "over sizing" of the nozzles 121, 125 may vary with one example being a capacity that would be needed to discharge an anticipated flow rate for the input water 140 if two thirds of the valves 120, 124 were closed (e.g., instead of using 3 GPM rated nozzles 121, 125, the nozzles 121, 125 may be chosen to be 9 GPM nozzles when water pressure is within a predefined pressure range). This allows the valves 120, 124 to be operated in an open/close pattern that causes a large number of the nozzles to be closed (e.g., up to two thirds in this non-limiting example) and still allow the input water 140 flow to be discharged as shown at 122, 126. The size/capacity of the nozzles, although oversized, still typically increases in capacity from the inner locations of the arm toward the outer locations of the arm.

The irrigation system 100 further includes a flow controller 150 to monitor and control operations of the pivot irrigator 110 and its nozzles 121, 125 via the control valves 120, 124 and the drive motors 133, 137. The controller 150, which may take the form of a desktop, laptop, tablet, irrigation system controllers (e.g., irrigation controller electronics presently commercially available or designed in the future modified to provide the functionality described herein), or other computing device, includes one or more processors 152 that manage and/or operate input and output devices 154, which may be used to allow an operator to input and view data (such as via a keyboard, touchscreen, mouse, monitor, and the like). The I/O devices 154 also are used to provide wired or, more typically, wireless communications with the pivot irrigator 110 and its components.

Particularly, as shown in FIG. 2, the controller 150 operates to receive data from a pressure gauge 142 and from a flow meter 144 via wired/wireless signals 143, 145, and the controller manages memory/data storage devices 160 to store the measured water pressure 162 and water flow rate 164 of the input water 140. Further, the pivot irrigator 110 includes a location monitor 118, such as a Global Navigation Satellite System (GNSS) receiver, Global Satellite Position (GPS) receiver/device or the like, that operates to gather location data (e.g., latitude and longitude information) for the sprinkler arm 116 that is transmitted in communications/signals 119 to the controller 150. For example, the location monitor 118 may be positioned at the outer end of the arm 116 distal to the center pivot base 114 and proximate to the last regular drive 137/tower 135 and be operated to obtain a present bearing (or angular orientation) of the pivot arm 116 during its use to irrigate a field. The processor 152 acts to at least temporarily store this arm location data (or pivot arm bearing) 166 in the memory 160.

Further, the I/O devices 154 are operated by the processor 152 to transmit control signals to the drive motors 133, 137 as shown at 190, 1991 and to the individual control valves 120, 124 for the nozzles 121, 125 as shown at 192, 194. In some cases (e.g., in a system 100 with a smart pivot 110), the controller 150 may ask the pivot's own controller (not shown in FIG. 1) to make a certain velocity while in other cases, as shown, the controller signals 190, 191 the motors 133, 137 only (and the motors 133, 137 drive themselves as discussed above).

The controller 150 also operates to execute or run software code/programs to provide a valve operation module 156 that operates, as discussed further herein, to process the irrigator monitoring data 162, 164, 166 and, in response, to generate the control signals 190, 191 to control the speed 134, 138 of the arm 116 and to control which valves 120, 124 are open and which valves 120, 124 are closed during each operating period. The operating period may be labeled a "valve duty cycle" and stored as shown at 178 in the memory 160. The valve duty cycle 178 may be varied to implement the irrigation system 100 with a time period in the range of 20 to 120 seconds typically being useful and with a 30 second time period being used in some of the examples provided herein. Prior to each valve duty cycle (e.g., prior to the next 30 second time period), the valve operation module 156 acts to determine a valve open/close pattern (or valve pulsing schedule) 180 for the valves of the pivot arm 116, and the pattern 180 defines which of the nozzles 121, 126 will be used to discharge 122, 126 the input water 140 (i.e., which valves 120, 124 will be controlled via signals 192, 194 to be open along the span of the arm 116) onto the circular area covered by the pivot arm 116.

To this end, the valve operation module 156 may process a variety of information to ensure ongoing use of the whole amount of the input water 140. The input data to the module 156 may include nozzle sizes or output capacity ratings 168 as well as the nozzle number and location along the arm 116 as shown as stored in memory 160. For example, a sprinkler arm 116 may include a relatively large number of nozzles 121, such as 30 to 250 or more, that are spaced apart some predefined/known distance, such as 5 to 20 meters or the like (e.g., the actual distance from the axis point (or element 114) may be recorded to each individual valve 120, 124/nozzle 121, 125 and then triangulate each valve's position individually). The valve operation module 156 can use the nozzle sizes/capacities 168 and number information 169 along with the water pressure 162 and/or flow rate 164 of the input water 140 to determine what fraction/percentage of the nozzles 121, 125 need to operate to output the input water. The final actual resulting valves open (valve pattern 180 for arm 116) may be done based on their flow rates in many implementations (and not on a percentage of the volume of the nozzles), and the percentage value may be used as a leading indicator with this ratio being used by the module 156 (in some cases) to help evenly space apart the valves that are open during an valve duty or irrigating cycle. Once the pattern 180 is defined for a next duty cycle, the controller 150 may operate at the start of the duty cycle to generate and transmit the control signals 192, 194 to the control valves 120, 124 (or only to those that have their operational status changed from the prior duty cycle in some implementations).

The arm speed 184 may also be set by the valve operation module 156 based on a particular valve open/close pattern 180. For example, a pattern 180 may be very dense (i.e., include many open valves 120, 124 in a relatively short span of the arm 116), and the arm rotation speed may be increased when such a pattern 180 is utilized so as to retain a desired uniform application depth in the irrigation zones under this dense pattern of opened valves. The arm rotation speed may be decreased when the pattern 180 is less dense so as to retain a desired uniform application depth in the irrigation zones under this less dense pattern of opened valves. The arm speed 184 is used by the controller 150 to generated and transmit control signals 190, 191 to the drive motors 133, 137 on the arm support towers 130, 135 to control or set the rotation speed of the arm 116 during the next or upcoming duty or operation cycle (e.g., for the next 30 seconds or other predefined operating cycle for the irrigation system 100).

FIGS. 2A and 2B also show that the irrigation system 100 includes a corner sprinkler arm 210 that is pivotally attached to the outer end of the pivot sprinkler arm 116 so as to selectively pivot about a pivot axis 227 (e.g., extending through the pivotal coupling between the two arms 116 and 210). As with the pivot arm 116, the corner sprinkler arm 210 is supported by one or more towers 220 with drive wheels 222, and a corner arm drive motor 224 is used to rotate the wheels 222 at a particular velocity, $V_{Corner}$, and to cause the arm 210 to swing in and out as shown with arrows 228 so as to trail the end of the pivot arm 116 (e.g., when at edges of a field being irrigated) and to swing out from the end of the pivot arm 116 (e.g., to extend the length of the arm 116 and apply water 140 to corners of a field).

The corner sprinkler arm 210 includes a plurality of valves 212, 216 (e.g., solenoid or other control-type valves) that are each coupled with one or more nozzles/sprinkler heads 213, 217 to selectively open and close the nozzles 213, 217 to release or apply the water 140 over a particular radius of application or coverage radius as shown with arrows 214, 218. A location monitor (e.g., a GNSS or GPS receiver) 230 is used to provide location data via signals 231 to the controller 150 to allow the controller 150 to determine and monitor the bearing or angular orientation 266 of the corner arm 210 relative to the end of the pivot arm 115 during irrigation operations. The controller 150 may transmit control signals 229 to the corner driver motor 224 to adjust the speed, VCorner, to follow a desired irritation pattern for a particular field (e.g., to selectively swing in and out 228 to water a corner or to trail to avoid obstacles at an edge of a field).

Additionally, the controller 150 operates to retrieve a valve open/close pattern 280 for each duty cycle of the irrigation system 100 that is stored in memory 160 and transmit control signals 250, 252 to the valves 212, 216 to selectively pulse the valves 212, 216 open or closed each duty cycle 178. This pattern or valve pulsing schedule 280 is defined for use in operating the valves 212, 216 to open and close the valves 212, 216 in a predefined pattern and at predefined bearings 166 of the pivot arm 116 and present locations/bearings 266 of the corner arm 210. With a proper open/close pattern 280, the nozzles 213, 217 can be operated to apply 214, 218 a uniform depth of the water 140 onto the field under the corner arm 210 as well as portions also covered by the pivot arm 116, as the corner arm nozzles such as nozzle 213 may overlap with coverage radii of nozzles/sprinkler head on the pivot arm 116 such as outer nozzles including nozzle 124 on the pivot arm 116. The following description provides a detailed explanation of the logic and/or algorithms used to generate an open/close pattern or pulsing schedule 280 for a corner arm 210 and the benefits of implementing such control process in a controller 150 of a center pivot irrigation system 100.

Figure 3:
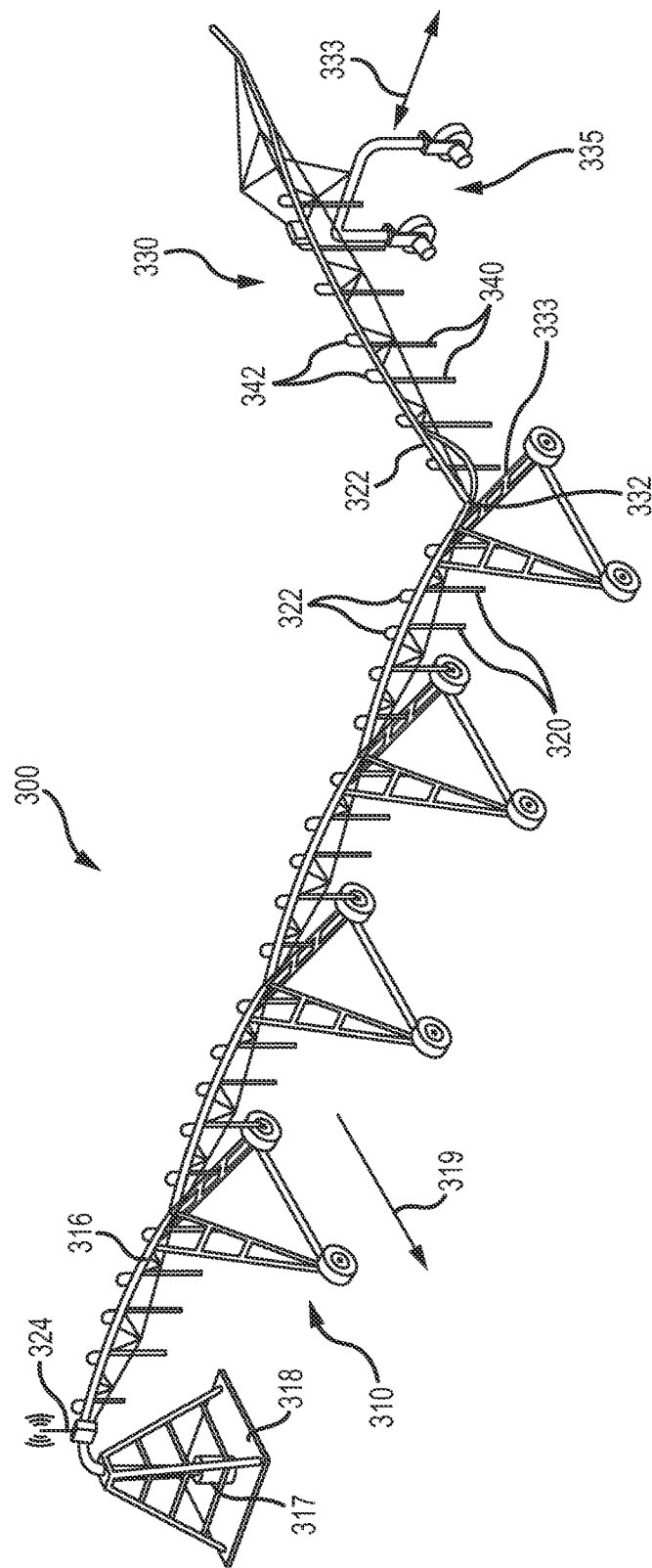
FIG. 3 illustrates a top perspective view of a center pivot irrigation system that may be used to implement all or portions of the system of FIG. 2.

FIG. 3 illustrates a top perspective view of a center pivot irrigation system 300. The irrigation system 300 includes a pivot arm assembly 310 with a pivot arm 316 extending outward from a center pivot base 318, and the drives of the pivot arm assembly 310 are operated to cause the pivot arm 316 to pivot or rotate 319 about the pivot base 318. A positive displacement or other type of pump 317 is provided at the base 318 to pump input water into the pivot arm 316. The pivot arm 316 includes a plurality of drop down nozzles/sprinklers 320 spaced apart along the length of the arm 316, and a solenoid valve 322 is provided on every sprinkler 320 to provide independent control of each sprinkler 320 with valve controller 324, e.g., to provide uniform flow over the circular area covered by the pivoting 319 arm 316 (note that pulsing of valves over the main pivot arm (or inner circle) typically is not needed to achieve uniformity as the variation in selection of sprinkler sizes can do this as described, but corner nozzle pulsing is used to achieve uniformity in the corner pivot arm (while the main nozzle valves are used for VRI or to keep uniformity when a variable speed is applied)).

The irrigation system 300 further includes a corner arm assembly 330 with a pipe/arm 332 pivotally coupled at a first end 333 to the end of the pivot arm/piping 316. This pivotal coupling allows the drive(s) on the wheels of the tower assembly 335 to cause the corner arm 332 to accelerate/decelerate to swing inward to trail the end of arm 316 or to swing outward to extend the arm 316 as shown with arrows 333. Like the pivot arm 316, the corner arm 332 includes a plurality of spaced apart drop down nozzles/sprinklers 340 that are each independently controlled or operated by solenoid or other control valves 342 that are opened and closed in a pulsed manner during movements 333 of the corner arm 330 such as by valve controller 324 to provide uniform depth application of water provided by pump 317 on land underneath the corner arm 332 (or its sprinklers 340).

Figure 4:
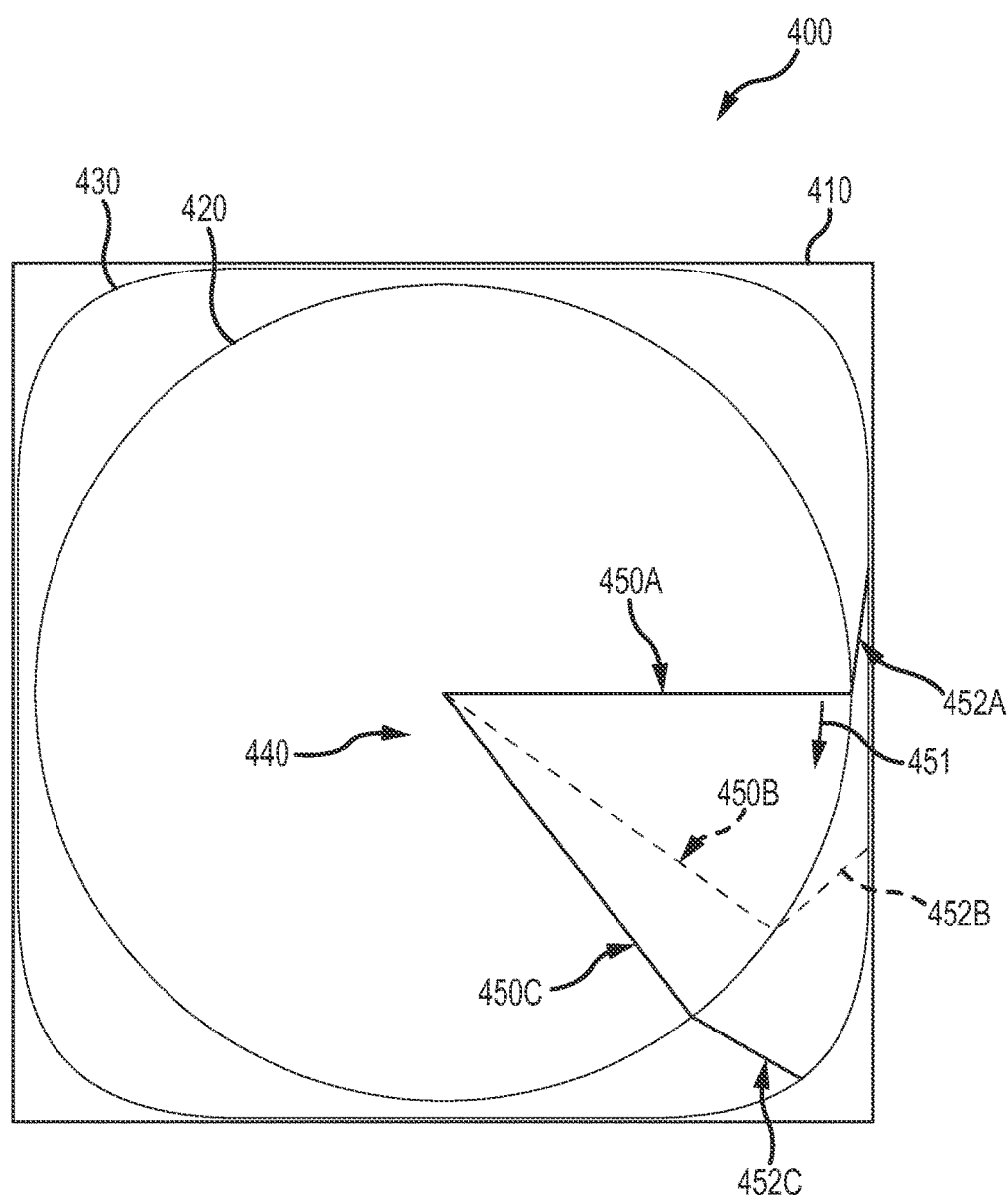
FIG. 4 illustrates an irrigation diagram for a field implementing the valve control method described herein and as may be provided by operation of the irrigation systems of FIGS. 2 and 3.

FIG. 4 illustrates an irrigation diagram 400 for a field 410 implementing the valve control method described herein and as may be provided by operation of the irrigation systems 200 and 300 of FIGS. 2A, 2B, and 3. As shown, a center pivot irrigation system 440 is operable to irrigate a circular area 420 such as with its center pivot base in the center of the square-shaped field 410. Through the use of corner arm, though, the irrigation system 440 is operable to irrigate a larger, near-square area 430, e.g., with the corner arm used to apply water in a relatively uniform manner to corners of the field 410 outside the circular area 420.

In a first operating state, the pivot arm 450A is operated (via valve control according to an open/close pattern for the pivot arm at a particular pivot arm bearing) to irrigate the center area 420 while moving 451 about its center pivot axis. The bearing of the arm 450A places the end of the arm 450A at or near the edge of the field 410. With this pivot arm bearing, the corner arm 452A is operated to be positioned in a trailing position (or state) relative to the outer end of the arm 450A. Further, though, the valves of the corner arm 452A are operated to be open or closed according to a pulsing schedule or open/close pattern particular to the corner arm 452A that is suited to the bearing of the pivot arm 450A and the trailing state or bearing/orientation of the pivot arm 452A (such as with most or many of the valves closed) to selectively discharge a desired amount of water on the narrow edge/portion of the field 430 being watered by the corner arm 452A.

At a later point in time during the operations of the irrigation system 440, the pivot arm 450B has rotated/moved 451 to a second bearing/location and is being controlled (valve controlled) to irrigate a different portion of the center area 420 of the field 410 according to a second open/close pattern selected for this duty cycle. Based on the new pivot arm bearing/location, the corner arm 452B is operated in a second state to be swung outward (at least partially) from the end of the pivot arm 450B to have a second bearing/orientation relative to the end of the pivot arm 450B and move its nozzles/sprinklers over a larger portion of the field 410 not watered by the pivot arm 450B (e.g., a larger portion of a corner of the field 410 in rectangular area 430). In this second orientation, the corner arm 452B is operated such as with a flow or valve controller to have its valves pulsed open and closed according to a second pulsing schedule or open/close pattern chosen specifically for the bearing/location of the pivot arm 450B for a particular duty cycle to achieve more uniform water application. For example, the arm 452B may be accelerating from its trailing position and have more of its nozzles/sprinklers over areas not covered by the pivot arm 450B such that it may be desirable to pulse more of the valves to their open positions with the pivot arm 450B at this bearing to more uniformly apply a depth of water on the field 410.

Further, at an additional later point in time during the operations of the irrigation system 440, the pivot arm 450C has rotated/moved 451 to a third bearing/location and is being controlled (valve controlled) to irrigate a different portion of the center area 420 of the field 410 according to a third open/close pattern selected for the present duty cycle. Based on the new pivot arm bearing/location, the corner arm 452C is operated in a third state to be swung outward (e.g., to its fullest extent) from the end of the pivot arm 450C to have a third bearing/orientation relative to the end of the pivot arm 450C and move its nozzles/sprinklers over a larger portion of the field 410 not watered by the pivot arm 450C (e.g., an even larger portion of a corner of the field 410 in rectangular area 430). In this third orientation, the corner arm 452C is operated such as with a flow or valve controller to have its valves pulsed open and closed according to a third pulsing schedule or open/close pattern chosen specifically for the bearing/location of the pivot arm 450C for a particular duty cycle to achieve more uniform water application. For example, the arm 452C may be moving at its maximum speed/acceleration and have all or more of the valves pulsed open compared with the arm 452B operating in the second operating state.

Figure 5:
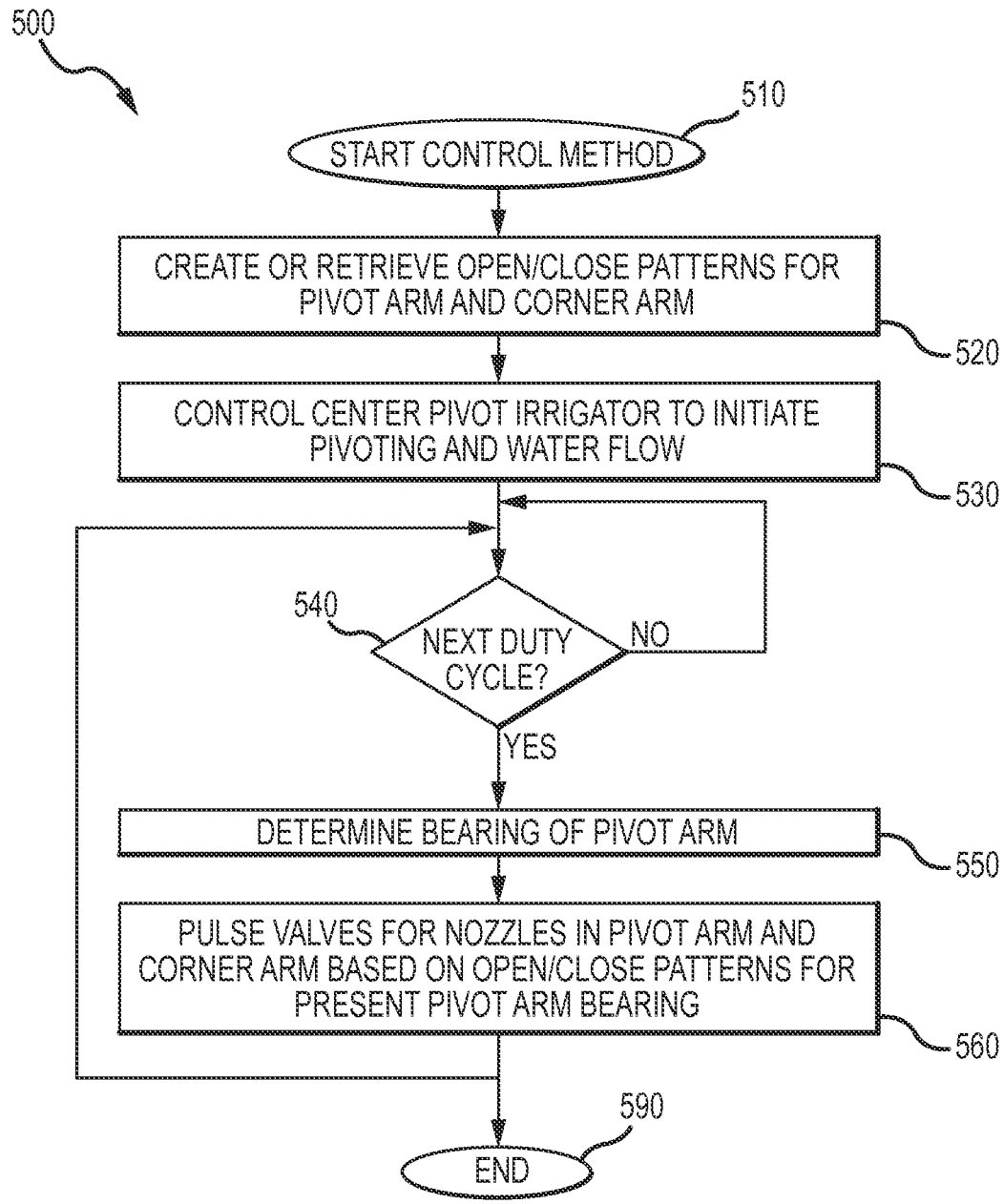
FIG. 5 is a flow diagram of an exemplary flow control method that may be implemented, e.g., by a controller of the systems of FIGS. 2 and 3, to provide more uniform depth or application of water input to an irrigation system.

FIG. 5 is a flow diagram (or algorithm) of an exemplary flow control method 500 that may be implemented, e.g., by a controller of the systems of FIGS. 2 and 3, to provide more uniform depth or application of water input to an irrigation system such as systems 100 and 300 of FIGS. 2 and 3. As shown, the flow control method 500 starts at 510 such as with downloading a valve operation module onto a valve controller of an irrigation system and, as needed, equipping the irrigation system with valves for controlling each nozzle/sprinkler along the length of the pivot arm and the corner arm. Further, the irrigation system may be modified to include one or more location monitors for determining a present location and/or bearing for at least the pivot arm and, in some cases, for the corner arm.

The method 500 continues at 520 with generating or retrieving from memory an open/close pattern (or valve pulsing schedule) for the pivot arm and its valves/nozzles and also for the corner arm and its valves/nozzles. The generation of this pattern/schedule for the corner arm is discussed in greater detail below, but, for now, it should be understood that the open/close pattern defines a pattern along the corner arm of open valves (operating nozzles) and closed valves (non-operating nozzles) for each particular bearing of the pivot arm for the entire rotation cycle of the pivot arm. The pattern may be repeated for some duty cycles (e.g., until move out of a corner or out of an edge area of a field) or modified between each duty cycle (e.g., when the corner arm is accelerating or decelerating rapidly). At 530, the flow control method 500 involves the irrigation system controller operating to initiate rotation of the pivot arm about its center pivot base (at a predefined speed or rotation rate). Step 530 also includes operating a pump(s) to begin to provide an input flow of water for irrigation into the pivot arm (or its pipes) and also into the corner arm (or its pipes) via a fluidic coupling with the end of the pivot arm.

The method 500 continues then at 540 with a determination if a next duty cycle (e.g., a time period that may be selected to be between 20 and 90 seconds such as 30 seconds in some prototypes of the presently described irrigation systems). If not, the method 500 continues with operating the irrigation system in a steady state (with the same open/close pattern to set which valves are opened and which are closed). If yes at 550, the method 500 continues at 550 with data from a location monitor (e.g., a GNSS receiver) being processed by the controller to determine the present location and/or bearing of the pivot arm (e.g., is the pivot arm near an edge of the field, partially into a corner, wholly into a corner, or the like).

With the bearing information for the pivot arm, the controller than acts at 560 to operate the valves of the irrigation system to provide desired flow to through the nozzles to achieve uniform water application across portions of the field under the irrigation system. To this end, the open/close pattern for this bearing for the pivot arm is used to pulse open or closed the valves of the pivot arm. Further, the open/close pattern for the corner arm for this particular bearing of the pivot arm is used to pulse open or closed the valves of the corner arm. Then, the method 500 may continue at 540 with determining whether the valve duty cycle has expired or whether the present valve pattern should be retained in the pivot and corner arms. Once the duty cycle is ended (e.g., a 30 second period has ended), the method continues at 550 with determining a new bearing of the pivot arm and, if needed for the new bearing, pulsing the pivot and corner arm valves open or closed according to a new open/close pattern associated with the new bearing. Otherwise, the irrigation system may be shut down and the control method 500 will end at 590.

With the general control method 500, it should be understood that the proper control relies upon successful calculation of a schedule of valve pulsing to obtain uniform irrigation. The application of the valve pulsing schedule can be provided to an irrigation system with a location monitor (e.g., an Irrigate-IQ product available from Trimble or the like with a GNSS module or the like) along with a main controller and valves that can be individually operated with a valve controller (e.g., a controller that is uniquely identified and controlled by the main controller). In one simulation or prototype, the inventor used a corner arm with thirty-four valves (and a like number of drop down sprinklers) each with a valve controller for each valve that was uniquely identified and controlled (e.g., the valve control nodes can be connected to the main controller via cable (wired communications) while the main controller is commanded via wireless communications).

To generate the corner arm's schedule of valve pulsing (that defined a specific open/close pattern for each pivot arm bearing), the path that the wheels of the corner arm followed/traveled during rotation of the pivot arm in a field was mapped to the field along with the center point and radius of the pivot arm. The position of each nozzle on the pivot arm and on the corner arm was recorded/mapped, too. Additionally, the positions of the nozzles on the pivot and corner arms were recorded/mapped, along with each nozzle's flow rate and radius of application (or radius of water flow from the nozzle at the flow rate).

The calculated or generated schedule of valve pulsing describes the open/close pattern of each valve on the corner arm (and pivot arm) for each bearing (or location) of the pivot arm as it rotates about its center pivot base in a particular field being irrigated by a center pivot irrigation system with a corner arm. The inventor divided the circle followed/covered by the pivot arm into a predefined number of bearing positions, such as 21600 bearing positions (i.e., 360 degrees multiplied by 60 minutes). A GNSS module was used at the last regular drive of the pivot arm (e.g., a location monitor provided immediately before (or inward) from the start of the corner arm or proximate to the pivotal coupling of the corner arm to the outer end of the pivot arm) to provide a controller with the location and the bearing of the main pivot pipe. Then, every thirty seconds (or other valve duty cycle), the main valve controller begins a process that instructs a controller at each valve to open or close the valve depending on the schedule of valve pulsing chosen for the bearing of the pivot arm. As an operational note (or practice tip), there is typically a controlled delay between each valve change to avoid sudden pressure changes in the pipe.

Figure 6:
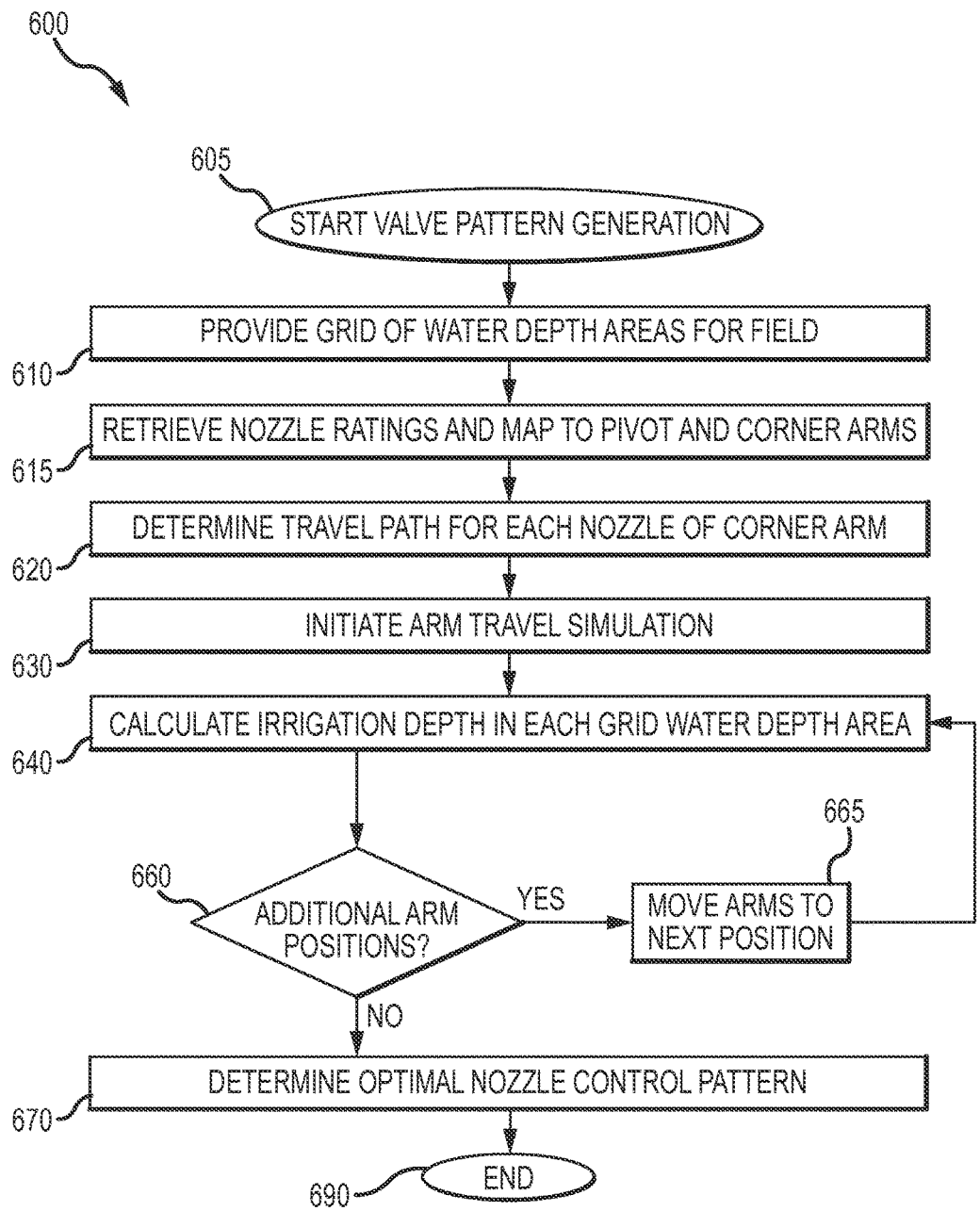
FIG. 6 is a logic flow diagram or algorithm for generating a valve pulsing pattern for use with at least the valves used to control flow to nozzles/sprinklers of a corner arm of a center pivot irrigation system.

FIG. 6 illustrates a logic flow diagram or algorithm 600 for generating a valve pulsing pattern for use with at least the valves used to control flow to nozzles/sprinklers of a corner arm of a center pivot irrigation system to provide uniform water depth or application during irrigation processes. The method 600 starts at 605 such as selecting a particular field to be irrigated and a center pivot irrigation system with a pivot arm and corner arm for use in irrigating the field (e.g., an irrigation system with known arm lengths, with a known number and type of nozzles/sprinklers, and with known positions of the nozzles along the pivot and corners arms).

The method 600 continues at 610 with providing or generating a grid of water depth recording/value areas for the field. Step 610 may involve creating a grid of depth value squares to cover a square having a size large enough to encompass the entire irrigated area of the irrigation system in the field. The size of each square water depth value areas in the grid is flexible to practice the method 600, but the size typically is chosen to be small enough to calculate variances in depth of irrigation across a single nozzle profile. For example, the size of the individual square areas may be a third to a half a meter or the like. In the third of a meter example, a pivot arm with a 400-meter radius can be associated with a square area—and associated grid—that is 1000 meters by 1000 meters, and the grid would encompass 9 million grid squares (or grid positions) for use in collecting/recording water depth from the nozzles of the irrigation system.

In step 615, the method 600 continues with retrieving or determining the ratings for each nozzle along with their positions on the pivot and corner arms. Then, the nozzles and their ratings are mapped to their positions on the appropriate arm of the irrigation system. Each nozzle in an irrigation system is individually rated based on its flow rate (e.g., number of liters it delivers per minute). Each nozzle is also rated or defined by the radius of throw or its radius of application when its valve is open (when it is used for irrigating). Additionally, the mapping in step 615 may include recording/mapping the distance from the last regular drive (or the end of the pivot arm) to the position of each nozzle on the corner arm.

The method 600 continues at 620 with determining the travel path over the field for each nozzle of the corner arm (and, in some cases, for the nozzles of the pivot arm or at least those affected by overlap with the corner arm nozzles). The corner arm of a center pivot irrigation system follows a predefined path (e.g., by predefined operations of the pivot arm and drive(s) of the corner arm) over the field during irrigation operations. The path is recorded and is used in step 620 to calculate an individual path of travel over the field for each nozzle on the corner arm.

At step 630, the simulation of travel of the pivot and corner arms over the field during an irrigation process is began or initiated. In step 640, the irrigation depth in each water depth area (or square) of the grid is calculated or updated. The method 600 continues at 660 with determining whether there exist additional pivot arm positions for the pivot arm to make a complete circle about the center pivot point for the field. If yes at 660, the method 600 continues at 665 with moving the pivot arm and the corner arm to the next position (and the nozzles of the corner arm to the next point on their travel path from step 620) and then at 640 with adding to the water applied to grid areas/squares under the moved nozzles (under their coverage/application radii from step 615).

If no at 660, the method 600 continues at 670 with determination of an optimal nozzle control pattern, at least for the corner arm and its valves used to open/close its nozzles/sprinklers to provide uniform application in areas affected by the corner arm of the irrigation system. Then, at 690, the method 600 is ended, and the open/close pattern or valve pulsing schedule from 670 (which defines a pattern of open/closed nozzles on the corner arm for each bearing of the pivot arm) is passed to a valve/flow controller of an irrigation system for use in irrigating the field used in the simulation of method 600.

In practicing the method 600, an irrigator or center pivot irrigation system can be simulated in time-based movements. For example, this can be the movement of the pivot arm and corner arm pivotally coupled to the pivot arm in each 30 second period (or other useful time period). In one implementation of method 600, the simulated position of each nozzle is moved to the position over the field it is expected to be in 30 seconds time (e.g., in step 665). When calculating the expected depth of irrigation based on a known nozzle control pattern, the depth of the grid area/square for each nozzle that is fed by an open valve and for each grid point that is within the coverage radius (or spray area) of the nozzle is incremented by the depth that the nozzle provides in this time period (e.g., in 30 seconds or the other time period used for time-based movements in step 665). For example, a nozzle with a throw radius of 5.8 meters will cover about 106 square meters. In an example grid with a third of a meter spacing, the nozzle will affect about 951 grid points at each time point for which the nozzle has its control valve opened. The depth at each of these grid areas or points at an exemplary flow rate of 25 liters per minute would be incremented (at step 640) by about 0.013 millimeters.

Calculating an optimal nozzle control pattern follows a similar process including iteratively increasing the amount of time that each nozzle will irrigate at each position until the desired depth of irrigation is reached. The typical nozzle on a pivot or corner arm of an irrigator is designed to work at a certain flow rate, and this means that to control the flow of an individual nozzle it is useful to pulse the nozzle on and off (by opening and closing its control valve). The proportion of time that the nozzle is allowed to distribute water can be controlled, in other words, by pulsing valves paired with each nozzle/sprinkler.

In order to maintain a consistency of pressure and flow in the overall irrigator, it may be desirable to orchestrate the timing of the valve changes in relation to each other. As a result of this desire, the valves may be pulsed in a regular time pattern. For example, each valve state change may be controlled so as to occur once every 30 seconds or other valve duty cycle. In such an example, for any 30-second time period, a valve is either open or closed for the entire 30 second period (or other useful valve duty cycle or pulsing time period).

The inventor also recognized, though, that valves are being moved during operations of the irrigation system even while they are being pulsed on and off. As a result, in order to achieve variation in the depth of irrigation over a certain piece of land, there is often a limit to how many valve state periods can be considered to be in the same place. For example, the inventor determined that an individual piece of land can more realistically be impacted by 6 thirty-second time periods over a total three-minute period.

Using this example of 6 thirty-second valve state periods to determine the optimal nozzle control pattern, one can simulate the irrigation system as described above six times, with each time at increasing flow rate for each valve. On the first iteration of the simulation each nozzle is considered to be running at one sixth of its rated flow. During the simulation process, the calculation determines whether each nozzle should be on at each time position. If a nozzle is determined to be off at a certain time position at the flow rate for this iteration, it will be excluded from consideration for iterations at a greater flow rate. On the second iteration of the simulation, each nozzle that was determined to be on at the one sixth flow rate is considered to be running at two sixths of its rated flow. During the simulation process, the calculation involves determining whether each nozzle that was on at the one sixth flow rate could be on at the two sixths flow rate at each time position.

This process is then repeated for each of the six flow rates for each nozzle, which results in a determined flow rate between zero and always on for each nozzle for each time position of the irrigation system (e.g., each position of the corner arm). To help ensure that the effect of the valve pulse rate is not overridden by a fluctuating change in the flow rate, a change to the flow rate of any valve may only be considered if that flow rate would remain constant for a certain number of cycles. For example, ensuring that the flow rate would remain the same for 30 cycles would ensure that five repetitions of a six-cycle flow rate occur.

The following is an exemplary algorithm or process that the inventor followed to generate a useful valve pulsing pattern for each valve/nozzle pair on a corner arm of a center pivot irrigation system, and this example can readily be used with other particular implementations to generate valve pulsing patterns for use in controlling an irrigation system to provide uniform application with a corner arm.

Initially, the simulation is run for non-corner nozzles. First, the non-corner nozzles are applied to the grid of water depth positions or squares at their full flow rate. This involves a recognition that: (a) the throw distance and flow rate of the nozzles before the last regular drive will overlap the land that the corner arm covers; (b) the corner arm nozzles will also throw water over the circular area covered by the pivot arm; and (c) both of these overlaps should be considered when determining at what flow rate each nozzle of the corner arm should be set. Second, for each non-corner nozzle and for each time period the following steps are performed: (a) determine the position of the center point of the nozzle at this time period; (b) determine which grid areas or positions will be affected by the nozzle; (c) determine the effective depth of application for this time period for each grid cell; and (d) add the effective depth of application to the depth at each affected grid area or position.

Then, the corner nozzles are considered or calculated in the pattern-generation algorithm. Note, the valves are processed in an order that helps to distribute the effective irrigation across the length of the corner arm. Specifically, the valve at the outermost extent is processed first and then each fourth valve in turn. Next, every fourth valve is considered starting at the third to the last or most outermost. In a next iteration, every fourth valve is considered starting at the second to the last or most outermost followed by processing of every fourth valve starting at the fourth to last valve. For example, a corner arm for which it is desired to provide a valve pulsing schedule may have 34 valves (and 34 nozzles or sprinkler heads), and the above-detailed processing would proceed as (with the numbers being used to represent the valves by number with the higher numbers associated with outer most valves): (1) 34, 30, 26, 22, 18, 14, 10, 6, 2; (2) 32, 28, 24, 20, 16, 12, 8, 4; (3) 33, 29, 25, 21, 17, 13, 9, 5, 1; and (4) 31, 27, 23, 19, 15, 11, 7, 3.

Next, for each proportion of flow rate (e.g., 1/6, 2/6, 3/6, 4/6, 5/6, and 6/6 or the like) and for each nozzle, the pattern generation algorithm includes: (a) determining the depth of irrigation for the nozzle at one increment of flow (e.g., always 1/6); (b) determining the depth of irrigation for the nozzle at this proportion of flow rate in each time period; (c) for each time period at the lowest flow rate and for each time period in subsequent flow rates that this nozzle was able to irrigate at the previous flow rate: (1) determining the position of the nozzle; (2) determining the deepest current depth of grid cells affected by this nozzle by checking each grid cell affected by this nozzle (note that the "deepest" may take the third deepest or the second standard deviation from the mean or such other calculation to exclude outlier values that could otherwise skew results); (3) calculating the variance between the desired depth of application and the deepest value found at the prior step, and an allowance above this variance (e.g., 5 percent) may be added to help provide a smooth result; and (4) if the variance is larger than the incremental depth of the nozzle and if the change to this rate will last for a minimum number of cycles (such as 30 cycles), recording in a schedule that this nozzle will be on at this proportion of flow at this time period; (d) once the entire cycle of the pivot has completed for determining this nozzle at this proportion of the flow rate, applying this flow rate to the grid; and (e) for each time period that the nozzle was recorded to be on at this flow rate (1) determining the position of this nozzle; (2) determining which grid positions or areas will be affected by the nozzle; and (3) adding the incremental depth of application for this nozzle to the depth at each affected grid position or area.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

I claim:

1. A center pivot irrigation system adapted for more uniform application, comprising:
   a pivot sprinkler arm comprising with a first set of spaced apart nozzles;
   a plurality of towers supporting the pivot sprinkler arm, wherein drives are provided on the wheeled towers to drive wheels on the towers to rotate the pivot sprinkler arm about a center pivot axis;
   a water supply providing input water to the pivot sprinkler arm;
   a first set of control valves each provided on the pivot sprinkler arm upstream of a nozzle in the first set of spaced apart nozzles;
   a corner sprinkler arm pivotally coupled to an end of the pivot sprinkler arm distal to the center pivot axis, wherein the corner sprinkler arm includes a second set of spaced apart nozzles, a corner arm tower supporting the corner sprinkler arm with a drive on the corner arm tower to drive wheels on the corner arm tower to selectively place the corner sprinkler arm in a trailing position, in an extended position, and positions between the trailing position and the extended position, and a second set of control valves each provided on the corner sprinkler arm upstream of a nozzle in the second set of spaced apart nozzles;
   a controller comprising memory and a processor running software code or programs stored in the memory to provide a valve operation, wherein the controller is communicatively linked with the first and second sets of control valves and transmits control signals to the first and second sets of control valves to open and close in a pattern defined by a valve pulsing pattern for the pivot sprinkler arm and a valve pulsing pattern for the corner sprinkler arm, whereby a subset of the nozzles in the first and second sets of spaced apart nozzles discharges the input water; and
   a location monitor periodically determining a bearing of the pivot sprinkler arm relative to the center pivot axis,
   wherein the valve pulsing pattern for the corner sprinkler arm is selected by the controller, based on the bearing of the pivot sprinkler arm, from a plurality of differing predefined open and closed patterns for the corner sprinkler arm, each of the differing predefined open and closed patterns being associated with a different bearing of the pivot sprinkler arm,
   wherein the control signals are transmitted at the beginning of each valve duty cycle, and
   wherein the valve pulsing pattern defines a first subset of the second set of control valves that are opened for an entire valve duty cycle and a second subset of the second set of control valves that are closed for an entire valve duty cycle, whereby the control valves of the second set of control valves are only opened or closed once per valve duty cycle.

2. The system of claim 1, wherein the valve duty cycles are equal time periods in the range of 20 to 90 seconds.

3. The system of claim 2, wherein the valve pulsing pattern for the corner sprinkler arm differs for at least a subset of the valve duty cycles.

4. The system of claim 1, wherein the plurality of differing predefined open and closed patterns for the valves on the corner sprinkler arm are adapted to provide a uniform application of the input water from the second set of spaced apart nozzles of the corner sprinkler arm as the pivot sprinkler arm rotates about the center pivot axis with the water supply providing the input water.

5. The system of claim 1, wherein the plurality of differing predefined open and closed patterns for the valves on the corner sprinkler arm are generated from a simulation of travel of the pivot sprinkler arm and the corner sprinkler arm along a travel path in a field during irrigation operations of the field and wherein the simulation includes measuring application of water from both the pivot sprinkler arm and the corner pivot arm into a plurality of grid areas and comparing the measured application of water in the grid areas with a goal depth of irrigation for the field.

6. A center pivot irrigation system adapted for more uniform application, comprising:
   a pivot sprinkler arm comprising with a first set of spaced apart nozzles;
   a plurality of towers supporting the pivot sprinkler arm, wherein drives are provided on the wheeled towers to drive wheels on the towers to rotate the pivot sprinkler arm about a center pivot axis;
   a first set of control valves each provided on the pivot sprinkler arm upstream of a nozzle in the first set of spaced apart nozzles;
   a corner sprinkler arm pivotally coupled to an end of the pivot sprinkler arm distal to the center pivot axis, wherein the corner sprinkler arm includes a second set of spaced apart nozzles, a corner arm tower supporting the corner sprinkler arm, and a second set of control valves each provided on the corner sprinkler arm upstream of a nozzle in the second set of spaced apart nozzles; and
   a controller comprising memory and a processor running software code or a program stored in memory to provide a valve operation that transmits, via a communication link, control signals to the first and second sets of control valves to open and close in a pattern defined by a valve pulsing pattern for the pivot sprinkler arm and a valve pulsing pattern for the corner sprinkler arm, whereby a subset of the nozzles in the first and second sets of space apart nozzles discharges input water,
   wherein the control signals are transmitted at the beginning of each valve duty cycle,
   wherein the valve pulsing pattern for the corner sprinkler arm differs for at least a subset of the valve duty cycles,
   wherein the plurality of differing predefined open and closed patterns for the valves on the corner sprinkler arm are generated from a simulation of travel of the pivot sprinkler arm and the corner sprinkler arm along a travel path in a field during irrigation operations of the field, and
   wherein the simulation includes measuring application of water from both the pivot sprinkler arm and the corner pivot arm into a plurality of grid areas and comparing the measured application of water in the grid areas with a goal depth of irrigation for the field.

7. The system of claim 6, and wherein the valve duty cycles are equal time periods in the range of 20 to 90 seconds.

8. The system of claim 6, further comprising a location monitor periodically determining a bearing of the pivot sprinkler arm and wherein the valve pulsing pattern for the corner sprinkler arm is selected by the controller based on the bearing of the pivot sprinkler arm.

9. The system of claim 8, wherein the valve pulsing pattern for the corner sprinkler arm is selected based on the bearing from a plurality of differing predefined open and closed patterns for valves on the corner sprinkler arm each associated with a different bearing of the pivot sprinkler arm.

10. The system of claim 9, wherein the plurality of differing predefined open and closed patterns for the valves on the corner sprinkler arm are adapted to provide a uniform application of the input water from the second set of spaced apart nozzles of the corner sprinkler arm as the pivot sprinkler arm rotates about the center pivot axis with the water supply providing the input water.

* * * * *